United States Patent
Dalcher et al.

(10) Patent No.: US 9,223,963 B2
(45) Date of Patent: *Dec. 29, 2015

(54) SYSTEMS AND METHODS FOR BEHAVIORAL SANDBOXING

(71) Applicant: McAfee, Inc., Santa Clara, CA (US)

(72) Inventors: Gregory William Dalcher, Tigard, OR (US); John D. Teddy, Portland, OR (US)

(73) Assignee: McAfee, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 13/898,284

(22) Filed: May 20, 2013

(65) Prior Publication Data

US 2013/0254884 A1 Sep. 26, 2013

Related U.S. Application Data

(63) Continuation of application No. 12/638,660, filed on Dec. 15, 2009, now Pat. No. 8,479,286.

(51) Int. Cl.
*G06F 21/53* (2013.01)
*G06F 21/56* (2013.01)

(52) U.S. Cl.
CPC .............. *G06F 21/53* (2013.01); *G06F 21/566* (2013.01)

(58) Field of Classification Search
None
See application file for complete search history.

(56) References Cited

U.S. PATENT DOCUMENTS

| 5,974,549 | A | 10/1999 | Golan |
| 6,167,520 | A | 12/2000 | Touboul |
| 6,480,962 | B1 | 11/2002 | Touboul |

(Continued)

FOREIGN PATENT DOCUMENTS

| CN | 1675623 A | 9/2005 |
| CN | 1961272 A | 5/2007 |

(Continued)

OTHER PUBLICATIONS

Office Action Received for Korea Patent Application No. 10-2012-7018451, mailed on Mar. 13, 2014, 14 pages of Office action including 8 pages of English translation.
Final Office Action Received for U.S. Appl. No. 11/738,703, mailed on Sep. 23, 2010, 17 pages.
Office Action Received for U.S. Appl. No. 11/738,703, mailed on Apr. 15, 2010, 19 pages.

(Continued)

*Primary Examiner* — Benjamin Lanier
(74) *Attorney, Agent, or Firm* — Blank Rome LLP

(57) ABSTRACT

Methods and system for behavioral sandboxing are described. In one example embodiment, a system for behavioral sandboxing can include a network and a computer. The network communicatively coupled to a source of an executable application. The computer communicatively couple to the network and including a behavioral analysis module and a plurality of execution environments. The behavioral analysis module is configured to perform behavioral analysis on the executable application downloaded over the network. The plurality of execution environments including a standard execution environment and a protected execution environment. The behavioral analysis module is configured to evaluate a plurality of behavioral characteristics of the executable application to determine whether the executable application should be executed within the protected execution environment prior to execution of the executable application. The behavioral analysis module also monitors execution of the executable application to determine whether the execution environment can be changed.

23 Claims, 9 Drawing Sheets

(56) References Cited

U.S. PATENT DOCUMENTS

| | | | |
|---|---|---|---|
| 6,611,925 B1* | 8/2003 | Spear | 714/38.14 |
| 6,760,441 B1 | 7/2004 | Ellison et al. | |
| 7,421,498 B2 | 9/2008 | Packer | |
| 8,239,948 B1* | 8/2012 | Griffin et al. | 726/24 |
| 8,332,947 B1* | 12/2012 | Bregman et al. | 726/25 |
| 8,479,286 B2 | 7/2013 | Dalcher et al. | |
| 8,813,222 B1* | 8/2014 | Codreanu et al. | 726/22 |
| 2003/0229794 A1 | 12/2003 | Sutton, II et al. | |
| 2005/0240999 A1 | 10/2005 | Rubin et al. | |
| 2006/0021029 A1 | 1/2006 | Brickell et al. | |
| 2006/0075494 A1 | 4/2006 | Bertman et al. | |
| 2006/0075500 A1 | 4/2006 | Bertman et al. | |
| 2006/0253578 A1 | 11/2006 | Dixon et al. | |
| 2007/0083929 A1 | 4/2007 | Sprosts et al. | |
| 2007/0136811 A1 | 6/2007 | Gruzman et al. | |
| 2007/0226773 A1 | 9/2007 | Pouliot | |
| 2007/0240217 A1 | 10/2007 | Tuvell et al. | |
| 2008/0010683 A1 | 1/2008 | Baddour et al. | |
| 2008/0104699 A1 | 5/2008 | Gounares et al. | |
| 2009/0044024 A1 | 2/2009 | Oberheide et al. | |
| 2009/0216768 A1 | 8/2009 | Zwilling et al. | |
| 2010/0071063 A1* | 3/2010 | Wang et al. | 726/23 |
| 2010/0153785 A1* | 6/2010 | Keromytis et al. | 714/38 |

FOREIGN PATENT DOCUMENTS

| | | |
|---|---|---|
| EP | 1 510 945 A1 | 3/2005 |
| EP | 1 613 010 A3 | 6/2007 |
| JP | 2007-122745 A | 5/2007 |
| JP | 2008-500653 A | 1/2008 |
| JP | 2009-500706 A | 1/2009 |
| WO | 2006/099282 A2 | 9/2006 |
| WO | 2007/003916 A2 | 1/2007 |
| WO | 2011084431 A2 | 7/2011 |
| WO | 2011084431 A3 | 10/2011 |

OTHER PUBLICATIONS

Office Action received for Japanese Patent Application No. 2012-544720, mailed on Jan. 7, 2014, 9 pages of Office Action including 5 pages of English Translation.

Communication Pursuant to Article 93 (3) EPC Received for European Application No. 8154997.4, mailed on May 20, 2009, 1 page.

European Search Report received for European Patent Application No. 8154997.4, mailed on Aug. 27, 2008, 9 pages.

Summons to Attend Oral Proceedings Received for European Application No. 8154997.4, mailed on May 31, 2010, 4 pages.

International Search Report and Written Opinion received for PCT Patent Application No. PCT/US2010/060340, mailed on Aug. 25, 2011, 3 pages.

International Preliminary Report on Patentability received for PCT Patent Application No. PCT/US2010/060340, mailed on Jun. 19, 2012, 5 pages.

Supplementary Search Report received for European Patent Application No. 10842508.3, mailed on Dec. 10, 2013, 1 Page.

Office Action received for Korean Patent Application No. 10-2012-7018451, mailed on Sep. 23, 2013, 15 Pages of Office Action including 8 Pages of English Translation.

Extended Search Report received for European Patent Application No. 10842508.3, mailed on Nov. 21, 2013, 7 Pages.

Notice of Allowance received for U.S. Appl. No. 12/638,660, mailed on Feb. 27, 2013, 5 Pages.

Office Action received for U.S. Appl. No. 12/638,660, mailed on Apr. 5, 2012, 9 Pages.

Office Action received for U.S. Appl. No. 12/638,660, mailed on Sep. 18, 2012, 13 Pages.

Notice of Allowance received for Korean Patent Application No. 10-2012-7018451, mailed on Sep. 1, 2014, 3 pages of Notice of Allowance Including 1 pages of English Translation.

Office Action received for Chinese Patent Application No. 2010800628082, mailed on Jul. 24, 2014, 7 pages of English Translation only.

* cited by examiner

SYSTEMS AND METHODS FOR BEHAVIORAL SANDBOXING

CROSS REFERENCE TO RELATED APPLICATIONS

This application is a continuation application of U.S. patent application Ser. No. 12/638,660, filed on Dec. 15, 2009, entitled "Systems and Methods for Behavioral Sandboxing", which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, McAfee, Inc. All Rights Reserved.

TECHNICAL FIELD

Various embodiments relate generally to the field of computer security, and in particular, but not by way of limitation, to a system and method for behavioral sandboxing of executable applications.

BACKGROUND

Increased access to the Internet has had the unintended effect of increasing the reach of software programs that capture personal information of users without their informed consent ("Spyware") or that corrupt computers without the user's knowledge and informed consent ("Malware"). In addition, a cottage industry has arisen in software that automatically downloads and displays advertising while an application is being used ("Adware").

Such programs, when installed on the user's computer, can eavesdrop on the user, collect sensitive information and, in some cases, take control of the user's computer. In some cases, these software programs send messages out to other computers or servers, providing a conduit for the transfer of potentially sensitive information.

Software applications have also become increasingly segmented through the use of plug-in components or other add-on type extensions to applications such as web browsers. The Internet provides an excellent distribution mechanism for these add-on components. However, it is difficult if not impossible to determine trusted from un-trusted sources of these add-on components. Additionally, the average user may be requesting, downloading, and installing add-on components without even knowing they are doing it.

What is needed is a system and method to analyze downloaded applications and components, monitor the applications and components during operation, and prevent any suspect operations from harming the host system.

BRIEF DESCRIPTION OF THE DRAWINGS

Some embodiments are illustrated by way of example and not limitation in the figures of the accompanying drawings in which.

DETAILED DESCRIPTION

Figure 1:
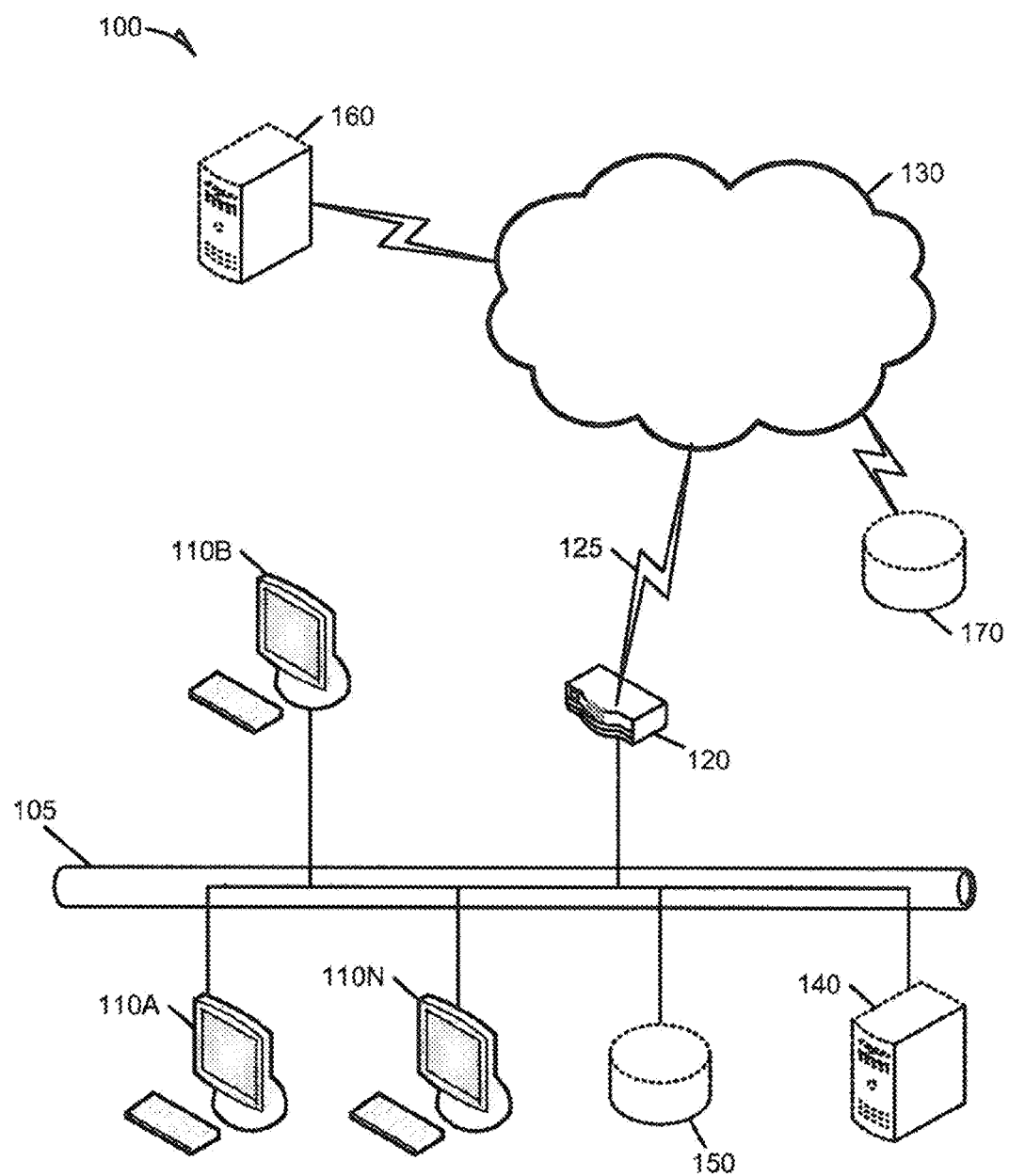
FIG. 1 is a block diagram that depicts an example system 100 capable of employing behavioral sandboxing of executable applications to enhance security.

Disclosed herein are various embodiments (e.g., examples) of the present invention for providing methods and systems for behavioral sandboxing. Behavioral sandboxing can provide a dynamic mechanism for protecting end-user systems from both known and unknown malicious software applications and components, while still allowing users the flexibility to run application and components from various sources.

As software becomes easier to distribute and applications become more and more fragmented it is increasingly difficult to distinguish between legitimate software and malware prior to execution of the software on a target platform. The extensive use of plug-ins components, run-time interpreted code, and other various types of downloaded software allows for legitimate software to be more easily compromised and used for malicious purposes. One technique for containing potentially malicious software is to run unknown or at-risk software within an area of containment known as a "sandbox." Operations performed by software (executable applications) running within the sandbox are limited to affecting only the sandbox and not the larger system or other applications currently running on the system.

Traditional sandboxing solutions have been inflexible in application and enforcement, often severely limiting an application's ability to function properly. Traditional approaches to sandboxing also lack the ability to dynamically determine what portions of an executable application need to be sandboxed and to what extend the sandbox environment must be shielded from other system resources and other applications (or parts of the main executable application). The following specification discusses solutions to these problems, among other things.

Behavioral sandboxing can use behavioral analysis to decide when a process should be run within a sandbox execution environment. Behavioral sandboxing can also monitor an application executing within a sandboxed execution environment to determine whether the application or portion of the application (e.g., a plug-in component) can be removed from the sandboxed environment and continue execution within a standard execution environment.

In an example, a sandbox environment can be configured to selectively shield the host system from individual operations instead of merely containing everything the sandboxed application may attempt to do during execution. For example, the sandbox execution environment can be configured to shield only attempts to update an operating system's configuration file (e.g., writes to the Windows® registry database). The sandbox environment can also be configured to allow certain inputs to pass into the sandboxed application and allow certain outputs to be communicated out from the sandboxed application to other local or remote applications. For example, the sandbox environment can be configured to allow the sandboxed application to read data from a database and update data within the database. However, the sandbox environment may be configured to prevent the same application from adding completely new records to the database.

In one example, behavioral analysis can be used to determine the scope of sandboxing to be applied to a web browser under normal use (e.g., browsing web pages on the Internet). When a user launches the browser application the launch can be detected by a system monitoring component. The system can hold the execution of the browser application while a behavioral analysis program determines whether the browser should be run within a sandbox environment and what level of restrictions should be placed on the browser if run within a sandbox environment. In certain examples, a security policy can be used to assist in determining whether to execute the application within a sandbox environment as well as the scope of restrictions to be used. In this example, a security policy is checked and behavioral analysis is run on the browser's history of operations. The behavioral analysis can include examining what plug-ins are configured to auto-load at browser launch and whether the plug-ins can be trusted. In this example, both the security policy and the behavioral analysis determine that the browser can be run in a standard execution environment upon launch.

The current example continues with the system continuing launch of the browser application. While the browser is launching, the system monitoring component is enabled to intercept all input and output from the browser application. The browser inputs and outputs can be feed into the behavioral analysis module to dynamically evaluate whether the execution environment of the browser (or any components of the browser) should be changed (e.g., moved into a sandbox execution environment to protect other processes or resources on the host system).

In this example, a user navigates to a web site that instructs the browser to download a plug-in component. The system monitor can intercept the plug-in download and collect information on the plug-in component for the behavioral analysis module. The behavioral analysis module can evaluate the collected information on the plug-in component to determine whether the plug-in component should be moved into a sandbox environment for execution. In an example, the behavioral analysis module can check the plug-in component's signature against a central trusted source database to determine whether the plug-in is potentially malicious. For example, the behavioral analysis module can check the universal resource locator (URL) associated with the plug-in component against an online reputation system, such as TrustedSource™ Internet reputation system (from McAfee®, Santa Clara Calif.).

In this example, the behavioral analysis module determines that the plug-in being downloaded by the browser is from a source that cannot be inherently trusted. The plug-in is redirected into a sandbox execution environment for further analysis. Once downloaded, the behavioral analysis module can perform additional analysis to determine the scope of restrictions to apply within the sandbox environment. For example, the behavioral analysis module can investigate whether the plug-in has a valid and signed security certificate. In this example, the plug-in either does not have a security certificate or it is not properly signed. So the plug-in is run completely within the sandbox environment where the system monitor can intercept all operations for analysis. During operation, when the plug-in attempts disk input and output that is intercepted by the system monitor and held. During plug-in execution, another process attempts input or output (I/O) to disk, the source of the additional I/O is determined and the I/O is allowed (as it is from an application outside the sandbox execution environment).

When execution of the plug-in completes the system monitor notes the end of execution and reduces the monitoring level associated with the browser application. Operations performed by the plug-in component during execution can be purged from the system or selectively allowed to update other processes or resources. For example, if the plug-in component attempted to bookmark a URL, the system may allow the browser's bookmarks to be updated with the information generated by the plug-in component. The system monitor can also be configured to log the operations performed by the plug-in for future use. For example, if the plug-in component did not attempt any potentially malicious operations, this can be logged within a local threat database or transmitted to a central online reputation system for future use.

In certain examples, a gateway system can be used to intercept and evaluate incoming executable applications. In the gateway system example, the gateway system can use behavioral analysis information collected by each client (end-user system) to assist in building up a knowledge base regarding plug-in component or other applets reused by multiple systems.

DEFINITIONS

The following definitions are given by way of example and are not intended to be construed as limiting. A person of skill in the art may understand some of the terms defined below to include additional meaning when read in the context of this specification.

Executable Application—For the purposes of the following specification, an executable application can include any complied binary application (e.g., .executable application or dynamical link libraries in a Microsoft Windows® environment), browser plug-in applications, browser or application scripts (e.g., Javascript™ or Visual Basic®. script), operating system control scripts (e.g., .bat files in a Microsoft Windows® environment or C-shell scripts in a Unix environment), and run-time interpreted code or applets (e.g., Java™ applets, Visual Basic® Controls, .Net™ code). Executable applications can encompass multiple individual processing units, such as processes, threads, and fibers. Additionally, some large executable applications may utilize dynamic link libraries (DLLs), scripts, or plug-in components to extend or enhance basic functionality. Within the following specification an executable application may be referred to variously as a process, an application, an executable, or simply as software.

Sandbox Execution Environment (Sandbox Environment)—For the purposes of the following specification, a sandbox execution environment can be a segmented portion of a host computing device that shields an executable application from directly accessing certain resources or devices that may be available within a standard execution environment. A sandbox execution environment can be configured to provide various levels of restriction of the operations attempted by an executable application. Throughout this specification a sandbox execution environment may also be referred to as a sandbox environment or a sandboxed environment, no change in the general meaning of the term is intended by any variation in usage.

Example Systems

FIG. 1 is a block diagram that depicts an example system 100 capable of employing behavioral sandboxing of executable applications to enhance security. The system 100 includes a network 105, client systems 110A, 110B, ... 110N (collectively referred to as client system 110), gateway device 120, wide area network connection 125, and wide area network 130. In certain examples, the system 100 can optionally include a local server 140, a database 150, a remote system 160, and a remote database 170. In an example the network 105 is a local area network (wired or wireless) communicatively connecting the client systems 110 to each other and to the wide area network 130. The gateway device 120 can be used to facilitate the connections to the wide area network 130. The gateway device 120 can include routing functions, filtering functions, and proxy functions. In certain examples, the gateway device 120 can be used to perform behavioral analysis on incoming executable applications, such as Java™ applets downloaded from remote systems. In examples where the gateway device 120 performs behavioral analysis on incoming executable applications, execution of suspect executable application can still occur on individual client systems 110. In some examples, the gateway device 120 can be configured to block known malicious executable applications based on application of a security policy and/or behavioral analysis.

In an example, the database 150 can be used to store the results of behavioral analysis performed on the client systems 110 or on the gateway device 120 for future use. In this example, the information stored in the database 150 can be re-used by systems (client systems 110 or the gateway device 120) when performing behavioral analysis on executable applications that have been previously used by a system connected to the network 105. In certain examples, the database 150 can communicate with a remote database 170 to exchange behavioral information about any known executable applications. The remote database 170 can represent one of the Internet reputation services, such as TrustedSource™ or another source of behavioral characteristics.

In some examples, the local server 140 can be a source of executable applications run by the client systems 110. In other examples, the remote server can also be a source of executable applications downloaded by the client systems 110. In still other examples, executable applications can be downloaded from any system or database available over the Internet or private wide-area network.

Figure 2:
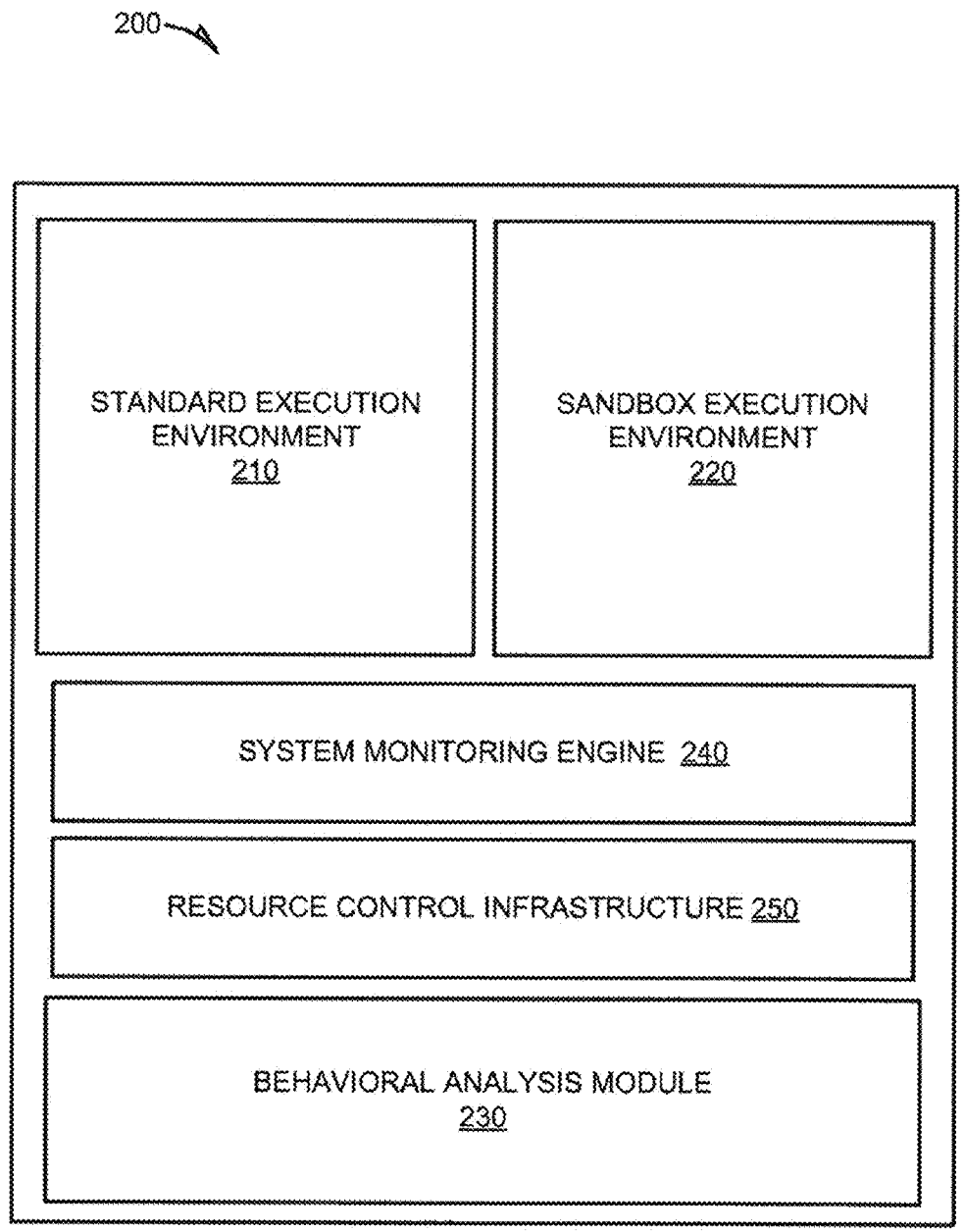
FIG. 2 is a block diagram depicting an example system configured to sandbox executable applications based on behavioral analysis.

FIG. 2 is a block diagram depicting an example system 200 configured to sandbox executable applications based on behavioral analysis. The system 200 can include a standard execution environment 210, a sandbox execution environment 220, a behavioral analysis module 230, a system monitoring engine 240, and a resource control infrastructure 250. In an example, the standard execution environment is used to execute any of trusted executable applications (e.g., those applications which do not indicate any threat of performing malicious activity or come from known and trusted sources). The standard execution environment 210 can be segmented into a multiple virtual machines or similar methods of segmenting execution of applications. Within the standard execution environment 210 segmentation of resources or memory space is done primarily for performance reasons, not necessarily to enhance security of the host system (e.g., client systems 110, local server 140, or gateway device 120).

The sandbox execution environment 220 can be configured to be totally segregated from the rest of system 200 in terms of resources and memory space. The sandbox execution environment 220 can provide the executable application a tightly controlled set of resources to run in, such as limited disk and memory space. The sandbox execution environment 220 can also control both local and remote network access, depending on configuration. For example, the sandbox execution environment 220 may allow certain local network access to read and write to a local database, but disallow any Internet access in order to limit potentially malicious behavior. In an example, the sandbox execution environment can be implemented through emulation. Using emulation, the sandboxed process runs within an interpreted environment rather than natively against the regular execution platform. In another example, the sandbox execution environment is implemented through the use of system virtualization. Virtualization allows for interception of resource operations and redirection of communications between processes. Alternatively, virtualization can be used to replicate the entire operating environment the process would execute in to mirror the non-sandboxed environment.

The behavioral analysis module 230 can be configured to analyze characteristics of an executable application as well as actual past or present operations performed by an executable application to predict the likelihood of malicious behavior. The behavioral analysis module 230 can analyze information about an executable application such as source, installation process, last modification, signature, and cryptographic certificate validity, among other things. The behavioral analysis module 230 can also analyze past logged operations as well as presently monitored operations performed by the executable application, such as opening of resources, loading of plug-in components, accessing the Internet, and attempting to read or write to configuration files or databases, among other things. Refer to discussion below related to FIG. 3 for additional details on an example behavioral analysis system.

The system monitoring engine 240 is used to monitor operations performed within the standard execution environment 210 as well as within the sandbox execution environment 220. The system monitoring engine 240 can provide valuable information to the behavioral analysis module 230 for use in determining whether an executable application is attempting (or likely to attempt) potentially malicious behavior. The system monitoring engine 240 can be configured to intercept attempts to access any of the system resources, including disk I/O, network device I/O, memory access, and even processor utilization. In certain examples, the system monitoring engine 240 assists in creating a sandbox environment by routing all resource requests to or from the sandbox environment. The system monitoring engine 240 can be configured to intercept resource access requests and alter the source or destination parameters before allowing the operation to continue. Examples of resources can include files, configuration databases (the Registry in Windows® as a prime example), memory (normally separated by process by the operating system, but could be manually redirected to provide finer granularity of separation), to name just a few.

The resource control infrastructure 250 provides a mechanism for the standard execution environment 210 and the sandbox execution environment 220 to control access to certain portions of system resources, such as configuration files or disk access. The resource control infrastructure 250 provides for blocking access to system resources and for the transparent redirection of access requests to mirrored resources. For example, the sandbox execution environment 220 can mirror (copy) a resource such as a database to allow an executable application operating within the sandbox to access the database. In this example, the resource control infrastructure can transparently redirect any attempts to access the primary database to the mirrored database. The sandbox environment 220 can then determine after execution of the sandboxed application whether to update the primary database with the mirrored database. In some examples, the resource control infrastructure can include a method of virtualization. Virtualization can create multiple completely segmented environments within a single hardware device (e.g., application server) that each operate as if they were separate hardware platforms.

Example Behavioral Analysis System

Figure 3:
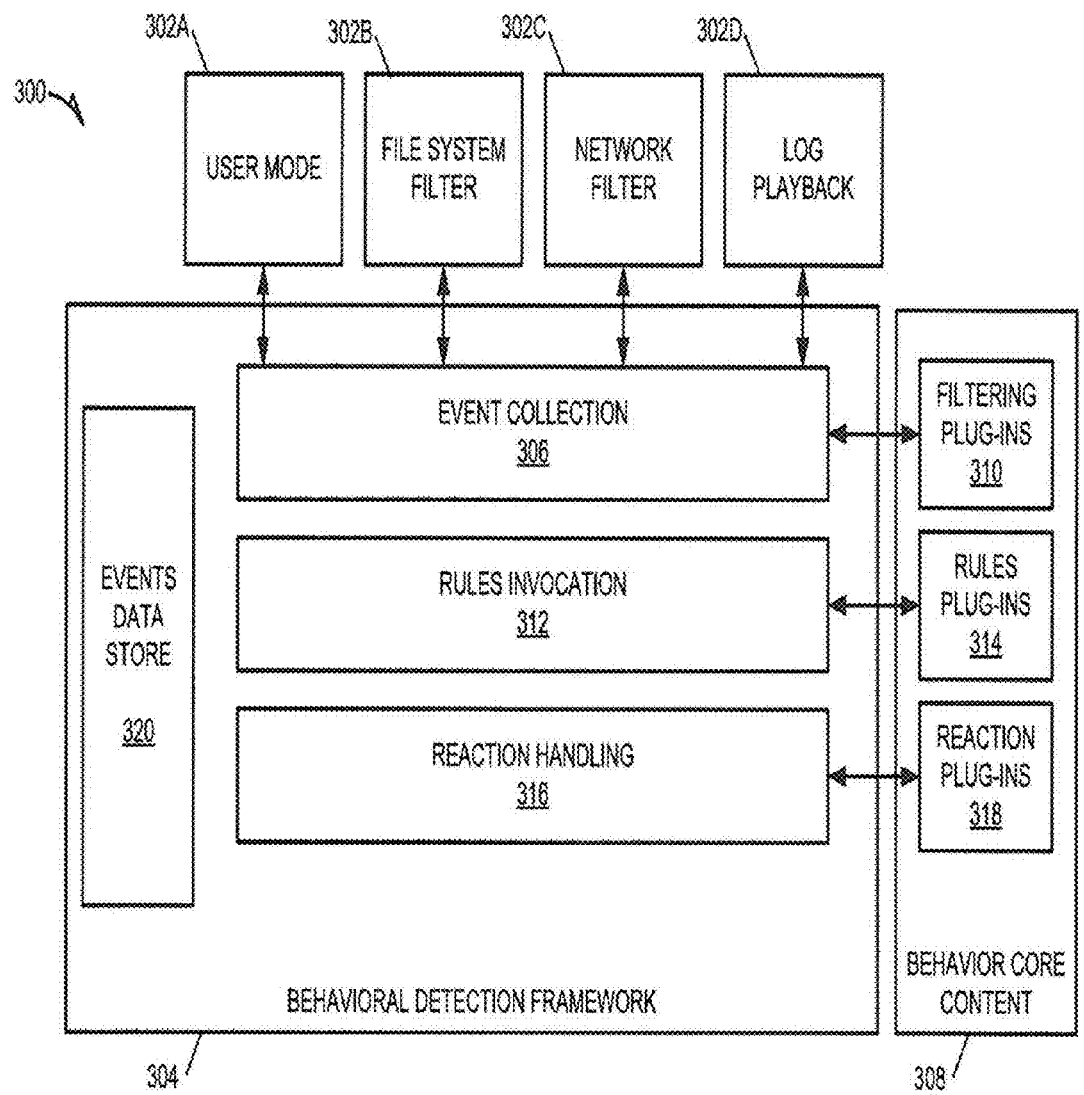
FIG. 3 is a block diagram depicting an example system for providing behavioral analysis of executable applications.

FIG. 3 is a block diagram depicting an example system 300 for providing behavioral analysis of executable applications. The system 300 includes a plurality of event sources 302A-302D, a behavioral detection framework 304, a event collection 306, filtering plug-ins 310, rules invocation module 312, rules plug-ins 314, reaction handling module 316, reaction plug-ins 318, and an events data store 320.

As shown, a plurality of event sources 302A-302D are provided. In the context of FIG. 3, event sources refer to any source capable of identifying, providing, and/or collecting events. In certain examples, the event sources 302A-302D may be provided by the system monitoring engine 240. A user mode event source 302A may be utilized to monitor user interfaces and collect events corresponding to user interfaces. In this case, the monitoring may include monitoring the execution of an interface. In various examples, this may be performed using in-line hooking, interface pointer redirection, and/or callbacks provided by an underlying infrastructure or operating system.

Additionally, a file system filter 302B may be utilized to collect events corresponding to file systems. Furthermore, a network filter 302C may be utilized to collect events associated with a network. It should be noted that any event source may be utilized as desired by a user or configured according to a organizational security policy. For example, a log playback interface 302D may be utilized to monitor events associated with a playback mechanism or any other advanced source that a user elects to monitor. In this way, a user may choose and plug-in any event source.

As shown further, the event sources 302A-302D are in communication with a behavioral detection framework 304 including a plurality of processing modules and an events data store 320. Furthermore, a behavior core content module 308 is provided including a plurality of plug-ins 310, 314, and 318 capable of operating with functionality of the behavioral detection framework 304.

In the context of FIG. 3, plug-ins refer to executable components that register for participation within a particular type of activity. For example, a plug-in may register within the behavioral detection framework 304 for invocation when a file creation event is published. The plug-ins 310, 314, and 318 may be utilized to actively participate in the processing within the various modules. In various examples, the plug-ins may be utilized to manipulate data into a useful form, screen and filter data, filter noise, and change event formats into a standardized or user defined format, etc.

In operation, events may be provided by the event sources 302A-302D and collected as part of an event collection process 306. As noted above, the event sources may include any event source and may be provided by a user (e.g. a consumer, etc.). In one example, the processing of events may be performed by event handlers that are consumer plug-ins. In this case, the event processing may include collating any event of interest within the data store 320.

As an option, event normalization may be performed on the collected events. In the context of FIG. 3, event normalization refers to converting events from a raw form closely tied with the event source into a generic or normalized form. In other words, the event normalization may include republishing intercepted raw events in a format agnostic of the event source. In some cases, raw events may be published by a system monitor (e.g. an event source, etc.). For example, a file system filter may publish raw events in response to intercepted file operations.

In one example, plug-ins (e.g. raw event handlers) may normalize the events and republish the normalized result. For example, an event handler plug-in may locate entries in the data store 320 and for an actor and target of an event. If data store entries for these items do not exist, the entries may be created.

Event details such as flags and pathnames may then be converted into a standardized format that is used for all events within a category, regardless of the event source. This conversion may be implemented for multiple event sources for a particular category. For example, file operations may be intercepted by the kernel mode file system filter 302B and the user mode interface monitor 302A.

The raw events from these event sources will not have the same structure necessarily. Event normalization may be implemented to resolve these differences such that normalized events may be published that allow users to be agnostic of these event source details. In this way, a plug-in included in the behavior core content module 308 may be utilized to perform the event normalization.

As an option, event normalization may also include the association of relationships between data store items, such as between the actor and target of an event. In one example, this association may be cumulative, forming an association between multiple data store items sharing a common history. More information regarding forming an association between multiple data store items sharing a common history may be found in U.S. patent application Ser. No. 12/177,601, filed Jul. 22, 2008, titled "SYSTEM, METHOD, AND COMPUTER PROGRAM PRODUCT FOR UTILIZING A DATA STRUCTURE INCLUDING EVENT RELATIONSHIPS TO DETECT UNWANTED ACTIVITY," which is incorporated herein by reference in its entirety.

Rules analyzing collated events may then examine the normalized event data as part of a rules invocation module 312. The rules invocation module 312 may be triggered by the received events. As an option, the evaluation of rules may drive detection of unwanted or other predetermined activity.

In one example, these rules may be user selected rules plug-ins 314, where the rule evaluation is initiated by event handlers. In another example, rules may also invoke other related and subordinate rules. Additionally, rules may be able to access the data store 320 of collated event information.

The rules may include any rule used to evaluate the collated data and determine if a detection may be made. These detections may include malware activity, improper transfer of data (e.g. as with data leakage prevention, etc.), or any other activity of interest. As an option, the rule may be generated by a user (e.g. a consumer, etc.). Furthermore, the rules may be independent from one or more event sources used to identify the events.

As noted, rules evaluation may be performed by handlers which register as plug-ins. The rules may be invoked through the behavioral detection framework 304. As an option, top-level rules may be invoked from within event handlers. These top-level rules may in turn invoke sub-rules as determined by an analysis of collated data. These sub-rules may in turn invoke other sub-rules, etc.

In various examples, the rules evaluation plug-ins 314 may perform the analysis directly, or invoke sub-logic written in an interpreted language. This usage allows for the bulk of the rules logic to be written in a specialized interpreted language script more easily used by rules authors, leaving the registered plug-in functioning as a shim whose task is to invoke the language interpreter with the appropriate sub-rule script and communicate the results back to the behavioral detection framework 304. This allows for a flexible and dynamic rules logic to be created that facilitates reuse of rules logic between rules sets.

Although not illustrated in FIG. 3, detection handlers may also register as plug-ins for invocation when a particular type of detection is published. In one example, detections may be published by rules handlers. Supporting detection handler registration allows for the sharing of information in a cross-functional manner.

For example, detection of high-risk activity such as the downloading of browser plug-ins from an unvetted website could be of interest to a browser script scanner. The script scanner may subject these plug-ins to a higher level of scanning. Additionally, a host-intrusion prevention product may also be interested in the download and subject the scripts to quarantining Finally, the determination that the web site the scripts were downloaded from was unvetted could have been announced via the publishing of a detection by a web site analysis tool.

In response to detection of the predetermined activity based on the rules, reactions are taken as part of a reaction handling module 316. In one example, the handling of these reactions may be provided by reaction plug-ins 318. In various examples, the reactions may include terminating a process, blocking an operation, and/or performing a selective scan operation, etc. More information regarding performing a selective scan operation may be found in U.S. patent application Ser. No. 12/111,851, filed Apr. 29, 2008, titled "SYSTEM, METHOD, AND COMPUTER PROGRAM PRODUCT FOR DYNAMICALLY ADJUSTING A LEVEL OF SECURITY APPLIED TO A SYSTEM," which is incorporated herein by reference in its entirety.

Reaction handlers may register as plug-ins for invocation when a particular type of reaction is requested. These reaction handlers may then carry out the reaction. This allows for the reuse of reaction types between users of the behavioral detection framework 304 and supports cross-functional applications such as the modification of system monitoring levels in response to detections.

This also allows for application of policy to end-nodes governing whether a reaction will be taken. For example, a requested reaction to terminate a process could first be checked by the reaction handler against the locally applied policy. The policy may indicate that the reaction should be logged but not actually taken for that end-node, which may be implemented when new anti-malware content is being initially deployed.

Detections within a function domain may then be published as events within the behavioral detection framework 304. In this way, users (e.g. consumers, etc.) may be able to both limit and dynamically adjust any impact of the behavioral analysis framework 304. Such system impact may include CPU usage, memory consumption, I/O bandwidth, etc. Furthermore, detections from within one function domain may be shared with other function domains or evaluated within a central domain for a holistic analysis.

The processing of events, the storage of collated data, and analysis of the data all use system resources. Using the behavioral detection framework 304, users may be able to set upper limits to such resource usage and dynamically control resource usage in response to behavioral analysis of collated data. One technique for controlling resource usage is by adjusting system monitoring and scanning activity. More information regarding controlling resource usage by adjusting system monitoring and scanning activity may be found in U.S. patent application Ser. No. 12/111,851, filed Apr. 29, 2008, titled "SYSTEM, METHOD, AND COMPUTER PROGRAM PRODUCT FOR DYNAMICALLY ADJUSTING A LEVEL OF SECURITY APPLIED TO A SYSTEM," which has been incorporated by reference in its entirety.

In one example, activity may be coordinated within virtual machines to control an overall system resource usage. This intra-virtual machine throttling may be applied to controlling the resource usage of instances of the behavioral analysis framework 304 operating within virtual machines.

Furthermore, users may plug-in to participate at every point of the analysis process. Additionally, user functionality may be installed, removed, upgraded, and their usage may be altered without an infrastructure change. The user may also collate events and associated data within the data store 320 for later reference and manipulation. Furthermore, the user may write behavioral analysis rules that are agnostic of event source details.

In this way, usage of the behavior detection framework 304 may be driven entirely by a user. For example, users may plug-in as event generators, event filters, event consumers, rules evaluators, detection handlers, and reaction providers.

This plug-in model facilitates construction of consumers of the behavioral detection framework 304 that share sub-components and the results of their detections. The plug-ins may include any executable components and may perform their analysis directly, or invoke sub-logic written in an interpreted language. For example, an interpreted rules language might be invoked by a rules evaluator plug-in.

In one example, plug-in support may be symmetric for all types of plug-ins. In this case, all of the plug-ins may allow all client-visible activity within the behavioral detection infrastructure to be driven by the publishing of actions, allow clients to register callbacks for invocation when a particular type of action is published, allow client callbacks to be called by the behavioral detection framework 304, and allow client callbacks to publish actions.

In one example, deployment of the behavior detection framework 304 may begin with using all systems monitoring techniques supported by a host environment (e.g., a client system 110). In the case, the host environment refers to the host of the security software. For example, the host may include an operating system or a web browser, etc.

The host environment may load security software including the behavioral detection framework 304 and provide at least basic capabilities. Some of this basic functionality may include file systems monitoring, network monitoring, and monitoring updating of a configuration database (e.g. monitoring registry operations, etc.).

As an option, the event handlers of this system monitoring may function as event filters and event generators. These handlers may be utilized to examine system monitoring notifications and filter out notifications that are not of interest. From the remaining notifications, the handlers may publish events with the behavior detection framework 304.

In one example, the events may be published synchronously, where the original operation is held while the event is published and serviced. In another example, the events may be published asynchronously, where the original operation is allowed to proceed while the event is published and serviced. In still another example, the events may be published within the same context as the original operation. In yet another example, the events may be published within a different context, particularly a central context monitoring operations taking place within several contexts. For example, the system monitoring engine 240 may be configured as a central context monitoring system to monitor operations taking place within each of the execution environments configured within a host system, such as system 200. This concept may also be applied at an organizational level with the local server 140 may be configured as a central context monitoring system to monitor operations taking place within each of the client systems 110.

In an example, contexts define where an event may be serviced within the behavior detection framework 304. In one example, only event users registered for that context will be notified of the event. For example, a file create operation may be intercepted within the context of a specific process (e.g., within the sandbox execution environment 220). If an event is published for that context, only event users registered for the context of that process may see that event. If the event is published for a larger system-wide context, event handlers registered for that system-wide context may see the event.

The behavior detection framework 304 may include various contexts. For example, in one example, the context may include a local context where user mode operations are specific to a particular process. In this case, there may be one local context per process of interest.

In another example, the context may include a kernel-mode context. In this case, kernel mode operations may cover all processes. In still another example, the context may include a system-wide context which is an aggregate for events published to the system-wide context from local and kernel-mode contexts. In this case, there may be one system-wide context per system. In yet another example, the context may include a network-wide context which is an aggregate for events published to the network-wide context from system-wide contexts.

As an option, a hierarchy of publication may be used. In this case, not all events capable of being viewed in the local and kernel-mode contexts may be published to the system-wide context, only those of sufficient interest. In this way, most events may be serviced within the context of the original operation. This allows for a more efficient behavior detection model that minimizes the overhead of publishing events to the system-wide context unnecessarily. Publication to the network-wide context may be even less frequent, avoiding unnecessary overhead.

In one example, control of propagation of an event within this hierarchy may be controlled directly by event handlers or by rules queries for greater flexibility. If event handlers are utilized, a reaction handler may perform the republishing of the event to a different level of the context hierarchy.

As noted above, event consumers may register to receive a notification when a particular type of event is published in the context the consumers register within. The notification may be invoked upon publication of events matching these criteria. As an option, the event consumers may examine the data included within the event. The consumers may also retrieve, create, and modify entries in the data store 320. The consumers may in turn publish events of their own, invoke rules, publish detections, and generate reactions.

As an example, the consumers of events published by the handlers of the original operation interceptions may republish these events as normalized events to facilitate an abstracted consumption by rules evaluators. In this usage, the initial events published are referred to as raw events and may only be viewed by event consumers whose function is to abstract these events into a generic form and re-publish the raw events as normalized events. The location of relevant entries within the data store 320, such as entries for the actor and target, may be included in the normalization process. The relevant entries may also include the data store entry for the originating process or thread of an intercepted operation and the data store entry for the target of the operation, such as for a file.

It should be noted that the data store 320 may include any repository used to collate event data. Furthermore, items may be created in the data store 320 for any user purpose, including items for tracking actors and targets for received events. For example, in response to an interception of a file, open entries may be created for the process that opens a file and for the actual file.

In various examples, the data store 320 may support adding, retrieving, and/or updating items. The data store 320 may also support the forming of associations between items, such as between parents and children, actors and targets, and objects sharing a common history. The data store 320 may be used by event handlers, event publishers, detection handlers, rules evaluators, and reaction handlers, etc.

More information regarding the example behavioral analysis system discussed above may be found in U.S. patent application Ser. No. 12/202,952, filed Sep. 2, 2008, titled "BEHAVIORAL ANALYSIS SYSTEM, METHOD, AND COMPUTER PROGRAM PRODUCT FOR PROPAGATING EVENTS OVER A PLURALITY OF HIERARCHICAL LEVELS OF PROCESSING," which has been incorporated by reference in its entirety.

Example Methods of Behavioral Sandboxing

The following examples illustrate how behavioral sandboxing can be used to dynamically protect an individual computing device or an entire network from malicious executable applications.

Figure 4:
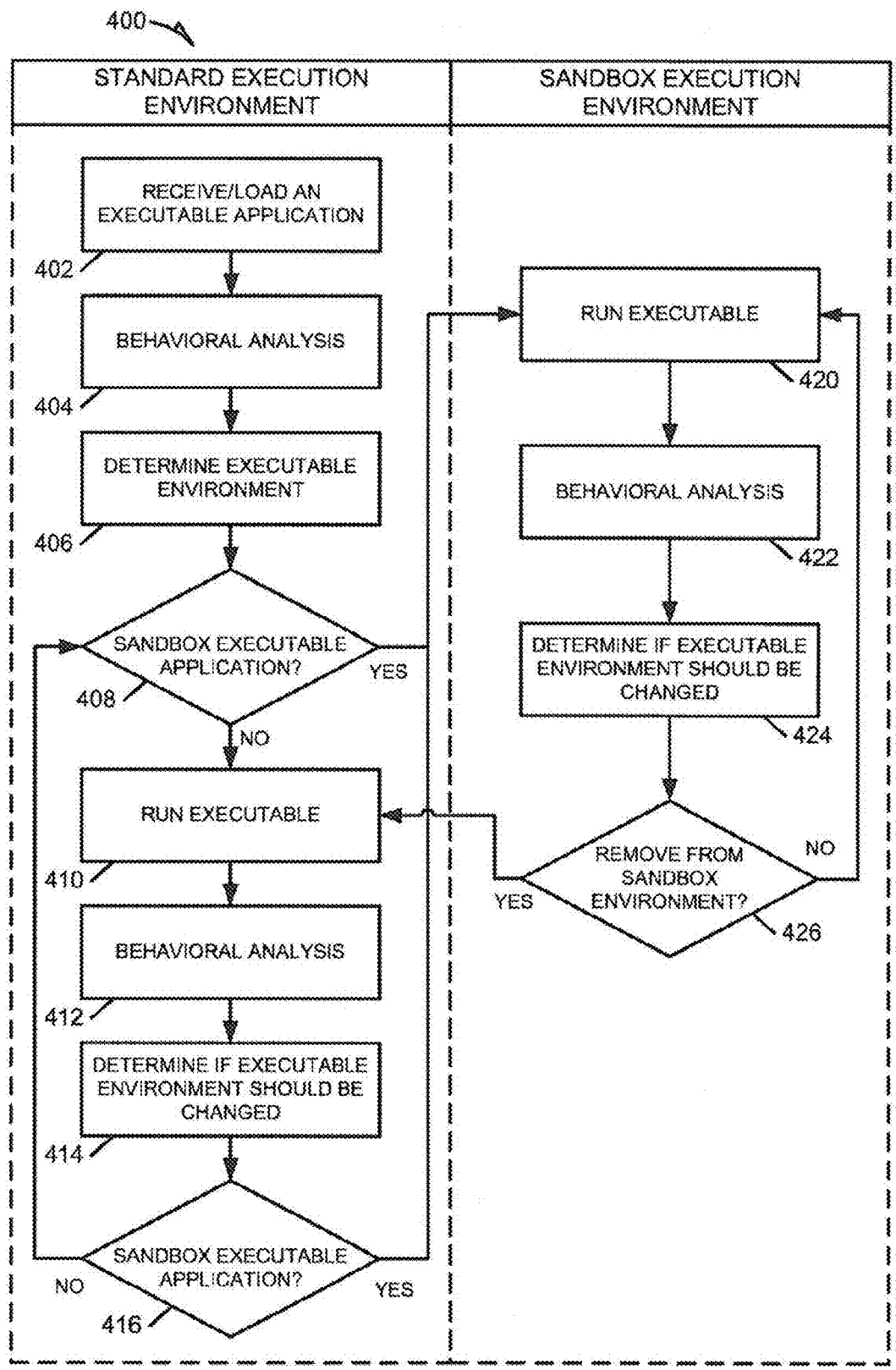
FIG. 4 is a flowchart with swim lanes that depicts an example method for behavioral sandboxing of executable applications.

FIG. 4 is a flowchart with swim lanes that depicts an example method 400 for behavioral sandboxing of executable applications. The method 400 includes operations for receiving an executable application at 402, behavioral analysis at 404, determining executable environment at 406, deciding to sandbox executable application at 408, running executable application at 410, behavioral analysis at 412, determining executable environment should be changed at 414, deciding sandbox executable application at 416, running executable application at 420, behavioral analysis at 422, determining executable environment should be changed at 424, and removing from sandbox environment executable in case you at 426.

In this example, the method 400 begins at 402 with the system 200 receiving or loading an executable application. At 404, the method 400 continues with the behavioral analysis module 230 performing behavioral analysis on the executable application. In an example, the behavioral analysis module 230 can collect a history of events including those pertinent to the origin of the executable application. The behavioral analysis module 230 can examine the history of the executable application about to be run. The behavioral analysis module 230 may analyze executable applications history for events such as: downloads from the Internet, installation by a trusted process, modification of code, cryptographically signed certificate from a trusted source, or performance of activity considered suspicious or out of policy when previously run.

In this example, the method 400 continues at 406 with the behavioral analysis module 230 determining which type of execution environment to run the executable application within. For example, if the behavioral analysis module 230 determines that the executable application can be trusted the method 400 may launch the executable application within a standard execution environment 210. If the behavioral analysis module 230 determines that the executable application has the potential of performing malicious activity then, at 408, the method 400 redirects the executable application into a sandbox execution environment, such as the sandbox execution environment 220. If the executable application is to be executed in the sandbox execution environment 220, the method 400 continues at 420 with the sandbox execution environment 220 running the executable application.

In the example where the executable application is running within the sandbox execution environment 220, the method 400 continues at 422 with the behavioral analysis module 230 performing behavioral analysis while the executable application is operating. In this example, the behavioral analysis module 230 continually and dynamically updates information on the executable application as it is executed within the sandbox environment 220. At 424, the method 400 continues with the behavioral analysis module 230 determining if the executable environment can be changed. For example, if the behavioral analysis module 230 determines after dynamically monitoring the executable application that the executable application no longer poses a threat to the system 200, the executable application can be removed from the sandbox environment 220. If executable application can be removed from the sandbox environment 220, then the method 400 continues at 426 by moving the executable application out of the sandbox environment 220 and into a standard execution environment 210. If the executable application cannot be removed from the sandbox environment 220, then at 426 the method 400 loops back to operation 420 and continues until the executable application completes or is moved out of sandbox environment 220.

Moving back to operation 408, if the behavioral analysis module 230 determines that the executable application can be executed within a standard execution environment 210, then the method 400 continues at 410 with the system 200 running the executable application within the standard execution environment 210. At 412, the method 400 continues with the behavioral analysis module 230 performing behavioral analysis on the executable application as it is running within the standard execution environment 210. At operation 412, the system 200 dynamically monitors the executable application for any signs to malicious (or suspicious) behaviors. The behavioral analysis module 230 watches for events that increase the exposure of the system 200 to malicious operations. Events watched for by the behavioral analysis module 230 can include: opening a resource files or databases, loading plug-ins (e.g., scripts and some executables such as libraries or DLLs), manipulation by other processes, manipulation of other processes, accessing the network, accessing the Internet, or accessing sites on the Internet outside a list of known good sites (e.g., blacklisted sites), to name just a few.

At 414, the method 400 continues with the behavioral analysis module 230 determining if the executable environment should be changed based on the monitored behavioral characteristics of the executable application. The dynamic behavioral analysis performed at operation 412 allows the system 200 to alter the executable environment of an executable application (or a portion of the executable application) while it is running. This enables the system 200 to protect itself from applications that appear to be safe but turn out to be malicious. For example, the behavioral analysis module 230 can determine that a certain application is from a known and trusted source, allowing the application to be launched within the standard execution environment 210. However, during operation the user may instruct the application to download a new plug-in from an unknown source. The behavioral analysis module 230 can be configured to intercept this event and instruct the system 200 to redirect the new plug-in into the sandbox execution environment 220 for execution and increased monitoring. In another example, the behavioral analysis module 230 may determine that an application can be executed within the standard execution environment 210 based on an analysis of historical behavior of the application. However, during execution the application may attempt to update the client system's 110 configuration database in violation of a security policy governing acceptable behaviors. In this example, the behavioral analysis module 230 can instruct the system 200 to move the executing application into the sandbox execution environment 220 to protect the system 200 from any further potential harm.

At 416, the method 400 checks with the behavior analysis module 230 to determine whether the executable application should be moved into the sandbox execution environment 220. If the executable application is to be moved, then the method 400 continues at 420 with the system 200 continuing execution of the executable application within the sandbox execution environment 220. If the executable application is not going to be moved into a sandbox environment, then the method 400 loops back to operation 408 and continues until the executable application terminates.

Figure 5:
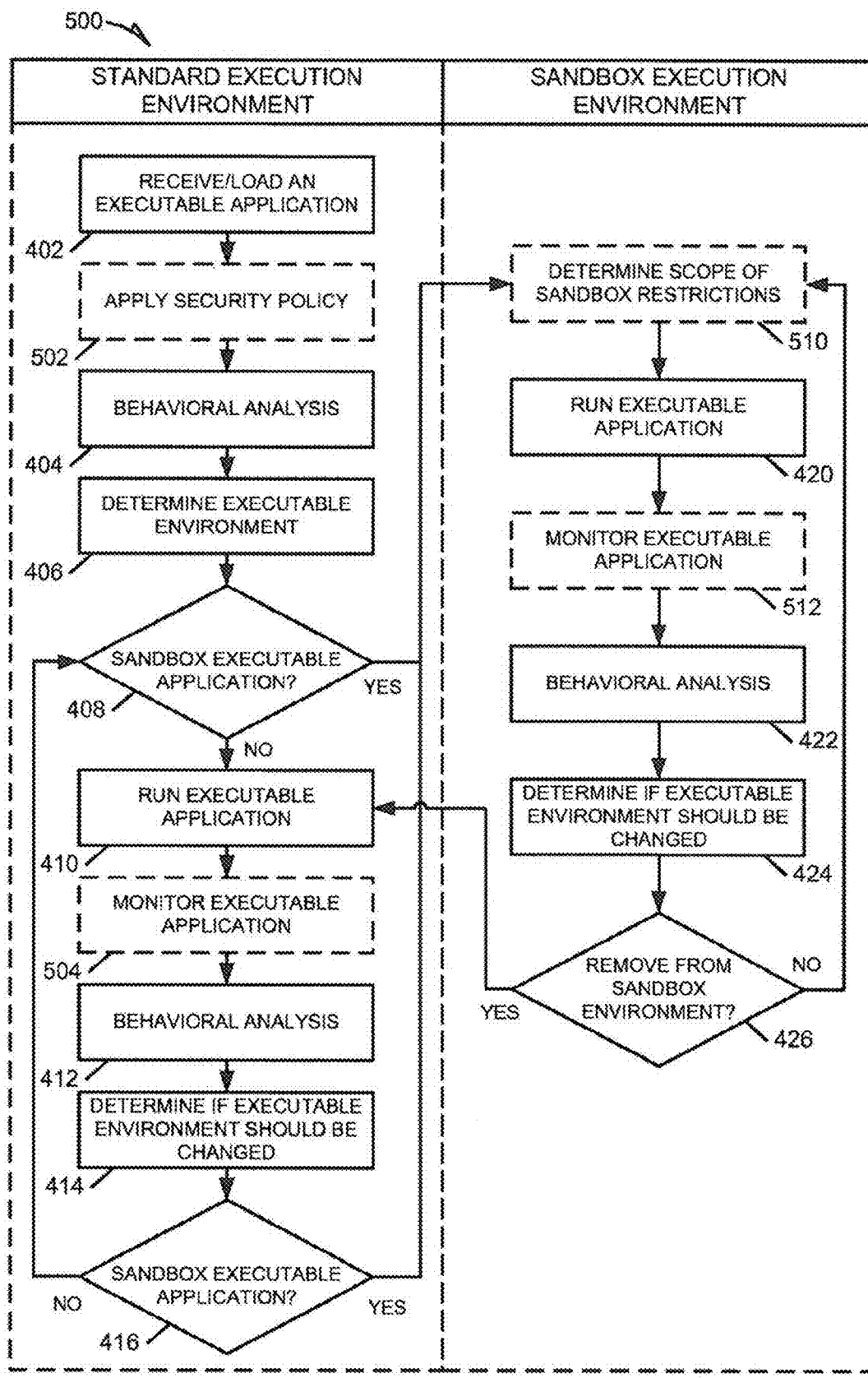
FIG. 5 is a flowchart with swim lanes that depicts a method for configuring an execution environment for an executable application using behavioral analysis.

FIG. 5 is a flowchart with swim lanes that depicts a method 500 for configuring an execution environment for an executable application using behavioral analysis. The method 500 includes the operations from method 400 with some additional optional operations, such as applying a security policy at 502, determining a scope of sandbox restrictions at 510, and monitoring the executable application at 504 and 512.

The method 500 includes an operation 502 where the behavioral analysis module 230 applies a security policy. In an example, the security policy can be obtained from a central server, such as the local server 140. In another example, the security policy can be local to each individual client system 110. In certain examples, the security policy can be controlled by a user. In other examples, the security policy can be controlled at the organization level by a network or system administrator. The security policies can include a list of restricted operations, a list of blacklisted sites or applications, applications to be run in a sandbox environment by default, specific exclusions to sandboxing, user or group level restrictions, user or group level permissions, and user or group level exemptions.

As depicted in FIG. 5, the security policy can be applied prior to the behavioral analysis module 230 performing any behavioral analysis at operation 404. Applying the security policy may identify executable applications that are either known to be trusted or known to be potentially malicious, preventing any further behavioral analysis from being necessary. The security policy can also be used to configure the behavioral analysis module 230. In other examples, a security policy may be applied at other points within the method 500 or merely used by the behavioral analysis module 230 in performing behavioral analysis.

The method 500 can also include an operation 510 where the behavioral analysis module determines the scope of restrictions to apply to the sandbox execution environment 220. In an example, the behavioral analysis module 230 can use information about the executable application to determine how restrict the controls on the executable application should be when the application is executed within the sandbox execution environment 220. In certain examples, the behavioral analysis module 230 can also use information derived from a security policy to configure the restrictions on the sandbox environment. The scope of restrictions can include: system resource access, access to network resources, Internet access, plug-ins signed by a trusted source, network address ranges, blacklisted sites, communication protocols (allow or restrict), communication with other processes, or communication with processes outside the sandbox environment. Allowing the behavioral analysis module 230 to selectively configure the sandbox environment can enhance the functionality of the sandboxing process enabling a finer level of control over what executable application are allowed to do, while still maintaining a minimum level of security. Selectively configuring the sandbox environment can also enhance security by allowing more executable applications to be monitored more closely within a sandbox environment while still enabling the executable application to perform necessary operations.

The method 500 includes operations 504 and 512 where the system monitoring engine 240 monitors a configurable range of operations performed by an executable application. At operation 504, the method 500 monitors the executable application executing within the standard execution environment 210. In an example, monitoring information gathered by the system monitoring engine 240 at 504 can be used by the behavioral analysis module 230 to determine whether the executable application should be moved into the sandbox environment 220. As discussed above, an executable application may need to be moved into a sandbox environment due to unexpected potentially malicious behavior detected after the application is initiated. At operation 512, the method 500 monitors the executable application executing within the sandbox execution environment 220. In an example, monitoring information gathered by the system monitoring engine 240 at 512 can be used by the behavioral analysis module 230 to determine whether the executable application can be moved out of the sandbox environment. Monitoring the execution of the executable application within the sandbox environment 220 can also be used to determine whether information generated by the application can be communicated outside the sandbox environment 220. Additionally, the monitored information can be used to dynamically increase or decrease the scope of restrictions applied to the sandbox environment 220.

Figure 6:
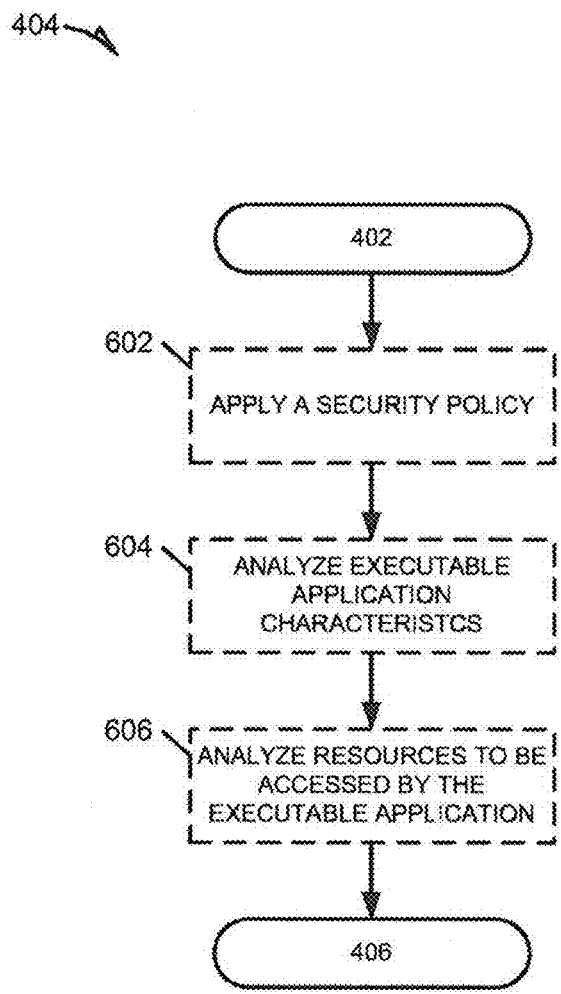
FIG. 6 is a flowchart depicting optional operations in the behavioral analysis of an executable application, in accordance with an example.

FIG. 6 is a flowchart depicting optional operations in the behavioral analysis of an executable application, in accordance with an example. A method 404 includes applying a security policy at 602, analyzing executable application characteristics at 604, and analyzing resources to be accessed by the executable application at 606. In this example, the behavioral analysis module 230 can be configured to perform operations 602, 604, and 606 both prior to execution of the executable application within a execution environment and while the executable application is running, for example at operation 422 within the method 400.

As depicted in FIG. 6, the method 404 begins with the behavioral analysis module 230 applying a security policy. In an example, applying the security policy configures how the behavioral analysis module 230 performs behavioral analysis. The security policy can control how the behavioral analysis module 230 reacts to an application's origin or an unsigned security certificate, for example. The security policy can also be used as a source of blacklisted URLs or applications, among other things.

At 604, the method 404 continues with the behavioral analysis module 230 analyzing all available characteristics about an executable application. Characteristics can include origin (e.g., URL or host system information), resource requirements, past operations, trust level (e.g., as determined by accessing an online reputation database), or security certificates. The behavioral analysis module 230 can use these characteristics to determine whether the executable application is likely to pose a threat of malicious activity.

At 606, the method 404 completes with the behavioral analysis module 230 analyzing resources that may be accessed by the executable application. In an example, the behavioral analysis module 230 can analyze the code of a run-time interpretable application to determine what resources the application may attempt to access. In another example, the behavioral analysis module 230 may rely on information detailing past operations performed by the application in order to determine what resource the application may attempt to access.

Figure 7:
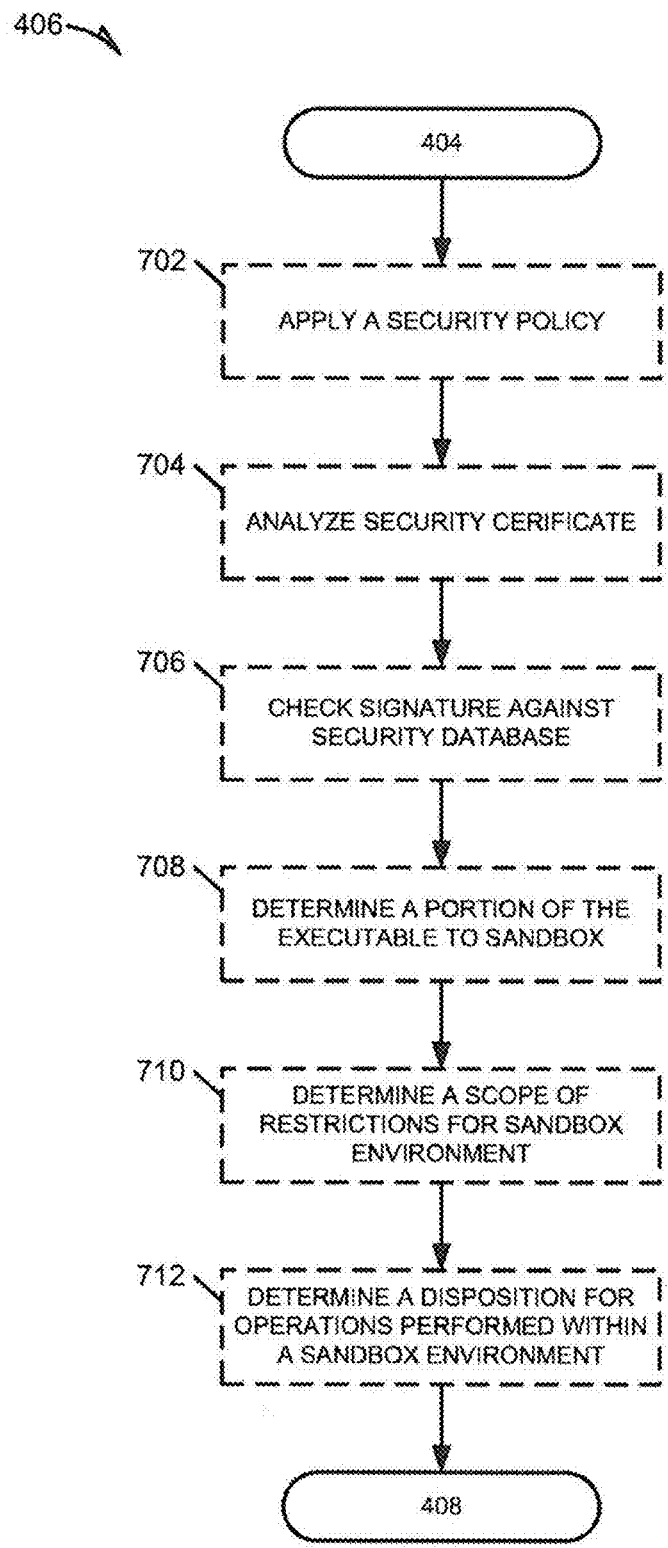
FIG. 7 is a flowchart depicting optional operations in determining an execution environment for an executable application, in accordance with an example.

FIG. 7 is a flowchart depicting optional operations in determining an execution environment for an executable application, in accordance with an example. The method 406, determining an executable environment, can optionally include operations such as, applying a security policy at 702, analyzing a security certificate at 704, checking application signature against a security database at 706, determining a portion of the executable application to run in a sandbox environment at 708, determining a scope of restrictions for the sandbox environment at 710, and determining a disposition for operations performed by the executable application within the sandbox environment at 712. As discussed above, a security policy can be applied at various points in a method for behavioral sandboxing, such as method 400 or method 500. In this example, the security policy can be applied by the behavioral analysis module 230 in determining an execution environment for the executable application.

In this example, the method 406 continues at operation 704 with the behavioral analysis module 230 analyzing the executable application's security certification. In an example, a downloaded application may be received over a secure communication channel, such as a secure sockets layer (SSL) or transport layer security (TLS). Typically SSL or TLS use certificates that are provided by a certificate authority and include digital signatures that can be validated. If the connection used to download the executable application was secured with a certificate with a valid digital signature it becomes more likely that the application comes from a source that can be trusted. The behavioral analysis module 230 can include the type of security and validity of the security certificate in determining whether the executable application should be run within a sandbox environment.

At 706, the method 406 can continue with the behavioral analysis module 230 checking an application signature (or other identifying characteristic) against a security database. In an example, signatures for each executable application can be created through a hashing algorithm and stored in a database, such as database 140. Information about the trust worthiness of an application can be catalogued in the database associated with the unique signature. Threat databases can be maintained locally or centrally, such as remote database 170.

A centrally located threat database can collect data on potentially malicious as well as applications known to be safe from multiple locations, thus providing a broader view of potential known threats.

At 708, the method 406 can continue with the behavioral analysis module 230 determining a portion of the executable application to execute within a sandbox execution environment. As discussed above, executable applications are often run as multiple threads of execution or may include multiple different components that can be executed somewhat independently. In an example, the system 200 is capable of running individual threads or even individual fibers of an executable application within a sandbox environment while allowing the remainder of the application to execute in a standard execution environment. For example, if the behavioral analysis module 230 determines that a certain thread of an application has a history of corrupting memory, the potentially malicious thread can be moved into the sandbox environment 220 for execution. The sandbox environment 220 can use a protected memory space to prevent any memory corruption from adversely affecting the remainder of the system.

At 710, the method 406 can continue with the behavioral analysis module 230 determining a scope of restrictions for the sandbox environment. As discussed above, the scope of restrictions for the sandbox environment 220 can include what level of I/O to allow within the sandbox, whether to allow the sandboxed application to communicate outside the sandbox environment 220, whether to allow processes outside the sandbox to manipulate processes run inside the sandbox environment 220, and whether to allow Internet access to processes within the sandbox environment 220, among other things.

Finally at 712, the method 406 can conclude with the behavioral analysis module 230 determining a disposition for operations performed within the sandbox environment 220. In an example, operations performed by a process within the sandbox execution environment 220 can be intercepted, for example by the system monitoring engine 240. Once intercepted the operations can be blocked altogether (silently or with an error sent to the user or calling application), allowed to access the intended resource (e.g., data in a database, memory location, network device), or redirected to a private location controlled by the sandbox environment. In this example, the behavioral analysis module 230 can determine based on behavioral characteristics of the executable application how the sandbox environment 220 is configured. For example, if the sandbox environment 220 is configured to redirect all operations into a private restricted resource space, the executable application is only allowed to interact with mirrored data from the main system. Upon termination of the sandboxed application, the private (mirrored) data is disposed of by either purging it from the system or updating the main system with the operations performed by the sandboxed application. Note, updating the main system is only likely to be allowed if the executable application did not violate any security policies or perform any potentially malicious operations during operation within the sandbox environment 220. In certain examples, processes operating outside of the sandbox environment may be allowed to access the private resources to obtain information generated by the sandboxed executable application.

Figure 8:
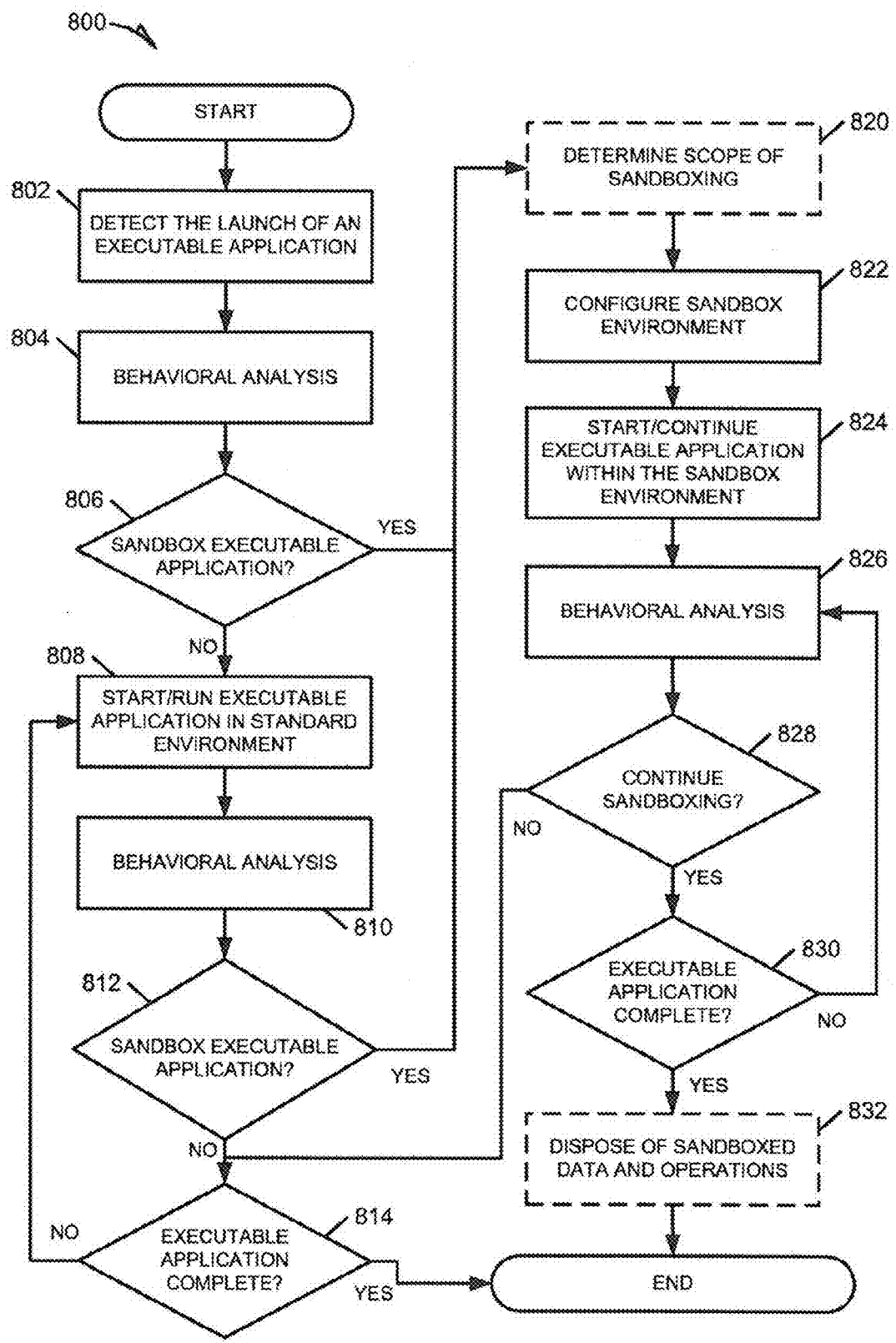
FIG. 8 is a flowchart depicting an example method of analyzing an executable application using behavioral analysis.

FIG. 8 is a flowchart depicting an example method 800 of analyzing an executable application using behavioral analysis. The method 800 includes the following operations detecting the launch of an executable application at 802, performing behavioral analysis of the executable application at 804, determining whether to run the executable application within a sandbox execution environment at 806, starting the executable application in a standard execution environment at 808, performing behavioral analysis on the running executable application at 810, determining whether the executable application should be moved into a sandbox execution environment at 812, determining whether the executable application is still running at 814, configuring the sandbox execution environment at 822, starting the executable application within the sandbox execution environment at 824, performing behavioral analysis on the running executable application at 826, and determine whether to continue running the executable application within the sandbox execution environment at 830. In some examples, the method 800 can also include determining the scope of sandboxing at 820 and disposing of sandboxed data and operations at 832.

In an example, the method 800 starts at 802 with the system monitoring engine 240 detecting the launch of an executable application. In this example, the system monitoring engine 240 can indicate to the system 200 to hold execution of the executable application while the executable application is analyzed to determine if it may be malicious. At 804, the method 800 continues with the behavioral analysis module 230 performing behavioral analysis on the executable application. The behavioral analysis module 230 analyzes the executable application for any indications of malware or violations of a security policy. Next, at 806, the method 800 continues with the behavioral analysis module 230 determining whether the executable application is moved into the sandbox execution environment 220.

The method 800 continues at 808 if the executable application is allowed to execution within a standard execution environment, such as standard execution environment 210. In an example at 808, the method 800 starts the executable application in the standard executable environment 210. At 810, the method 800 continues with the behavioral analysis module 230 performing behavioral analysis on the running executable application. In certain examples, the system monitoring engine 240 can be used to monitor operations performed by the executable application. The monitored operations can be analyzed for potentially malicious behavior by the behavioral analysis module 230. At 812, the behavioral analysis module 230 dynamically determines whether the running executable application should be moved into a sandbox environment. The method 800 continues at operation 814 if the executable application is not moved into a sandbox environment at 812. At 814, the method 800 continues with the system 200 determining if the executable application has terminated. The method 800 loops back to operation 808 if the executable application continues to run.

Back at operation 812, if the behavioral analysis module 230 determines that the executable application is exhibiting potentially malicious behaviors, then the method 800 continues by moving the executable application into the sandbox execution environment 220.

The method 800 performs similar tasks whether sandboxing a running executable application or an executable application that is still in the process of being launched. In certain examples, the method 800 starts the sandboxing process at 820 with the behavioral analysis module 230 determining a scope of sandboxing. The scope of sandboxing can include how restrictive the sandbox environment is on things like disk I/O or network access as well as what portion of the executable application is actually run within the sandbox environment 220. In an example, the sandboxing process starts at operation 822 with the behavioral analysis module 230 configuring the sandbox environment 220 according to inputs such as the scope of sandboxing or a security policy.

In an example, once the sandbox execution environment 220 is configured, the method 800 continues at 824 by starting or continuing the executable application within the sandbox execution environment 220. Next, the method 800 continues at 826 with the behavioral analysis module 230 performing behavior analysis on the running executable application. In this example, behavioral analysis is performed on an executable application running within the sandbox execution environment 220 in order to dynamically determine whether changes in the executable application or the surrounding environment allow for the executable application to be removed from the sandbox execution environment 220. At 828, the method 800 continues with the behavioral analysis module 230 determining whether to continue sandboxing the executable application. The method 800 continues on to operation 830, if the executable application remains within the sandbox execution environment 220. At operation 830, the system 200 determines whether the executable application continues to execute. The method 800 loops back to operation 826 if the executable application continues to run. If the executable application has terminated, then the method 800 finishes at operation 832. At 832, the system 200 disposes of sandboxed data and operations. Disposal of the sandboxed data can include purging the information from the system or allowing the system 200 to apply updates to the affected resources. In certain examples, the sandboxed data and operations can also be made available to processes within the standard execution environment 210, while keeping the data and operations within segmented resources.

Back at operation 828, the method 800 continues at operation 814 if the it is determined that the executable application can be removed from the sandbox execution environment 220.

The above methods are primary described in terms of operation within a client system 110. However, similar methods or portions of the methods described above can be implemented within a gateway device 120. For example, the gateway device 120 can be configured to detect executable application being downloaded from the wide area network 130. The gateway device 120 can also be configured to perform behavioral analysis on the incoming executable applications. The results of the initial behavioral analysis can be shared with the client systems 110, the client systems 110 can then sandbox the incoming executable applications as appropriate.

Modules, Components and Logic

Certain embodiments are described herein as including logic or a number of components, modules, engines, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiples of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a SaaS. For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of these. Example embodiments may be implemented using a computer program product (e.g., a computer program tangibly embodied in an information carrier, in a machine-readable medium for execution by, or to control the operation of, data processing apparatus, a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, for example, a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
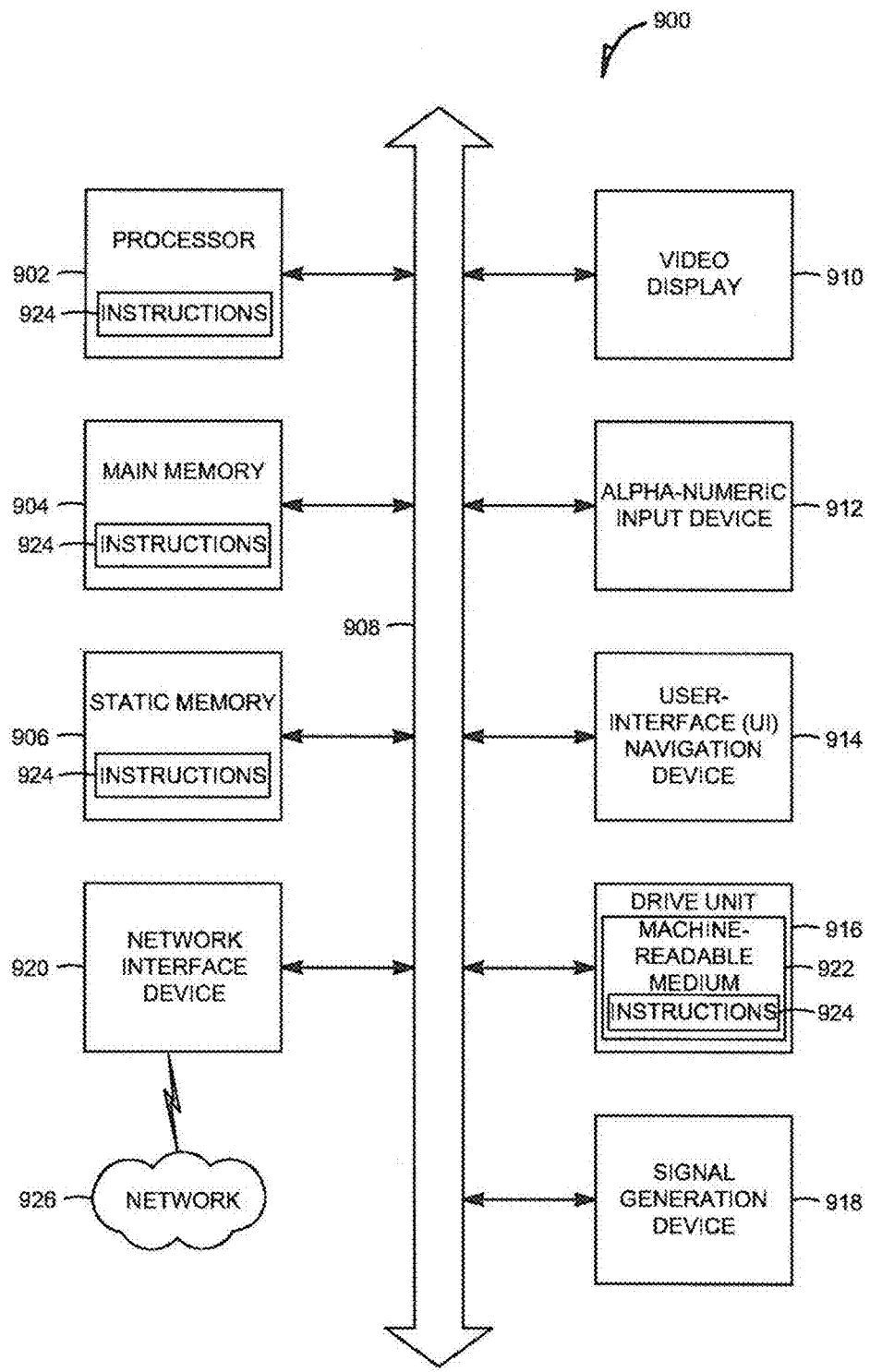
FIG. 9 is a block diagram of a machine in the example form of a computer system within which instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. As such, the computer system 900, in one embodiment, comprises the system 900. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of data structures and instructions (e.g., software) 924 embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more data structures and instructions 924. The term "machine-readable medium" shall also be taken to include any tangible medium that is capable of storing, encoding or carrying instructions for execution by the machine and that cause the machine to perform any one or more of the methodologies of the present embodiments of the invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Thus, a method and system for making contextual recommendations to users on a network-based marketplace have been described. Although the present embodiments of the invention have been described with reference to specific example embodiments, it will be evident that various modifications and changes may be made to these embodiments without departing from the broader spirit and scope of the embodiments of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, if used the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method for dynamically determining an execution environment in a system having a plurality of execution environments including a first execution environment and a second execution environment, the second execution environment being a protected execution environment, the method comprising:
  performing behavioral analysis on an executable application prior to each execution of the executable application, comprising:
    requesting behavioral information regarding prior performance of suspicious or out of policy activities of the executable application from a remote security database prior to each execution of the executable application; and
    evaluating the behavioral information obtained responsive to the request;
  determining an initial execution environment based on the behavioral analysis prior to each execution of the executable application, comprising:
    determining a first portion of a single execution of the executable application for execution in the first execution environment and a second portion of the single execution for execution in the second execution environment; and
    determining the initial execution environment as one of the first execution environment and the second execution environment;
  loading the executable application for execution in the initial execution environment;
  collecting behavioral characteristics of the executable application as it is executed within the initial execution environment; and
  determining from the collected behavioral characteristics whether execution of the executable application should be moved from the initial execution environment to a secondary execution environment while the executable application is still executing in the initial execution environment, wherein only one of the initial execution environment and the secondary execution environment is a protected execution environment.

2. The method of claim 1, wherein performing behavioral analysis prior to execution further comprises evaluating one or more characteristics associated with the executable application that indicate an origin of the executable application.

3. The method of claim 2, wherein performing behavioral analysis prior to execution comprises analyzing resources the executable application will utilize.

4. The method of claim 2, wherein the one or more characteristics include one or more of the following:
   network address the executable application was received from;
   trust level of a process that requested the executable application; and
   signed certificate from a trusted source.

5. The method of claim 1, wherein loading the executable application for execution within the second execution environment comprises determining a scope of restrictions to apply to the second execution environment prior to execution of the executable application.

6. The method of claim 5, wherein determining the scope of restrictions comprises determining what types of activity should be contained within the second execution environment.

7. The method of claim 5, wherein determining the scope of restrictions comprises determining a disposition for operations performed within the second execution environment by the executable application.

8. The method of claim 1, wherein determining from the collected behavioral characteristics comprises detecting potentially malicious activities including:
   opening resource files;
   loading plug-ins;
   manipulation by other processes;
   manipulating other processes; and
   accessing the Internet.

9. The method of claim 1, wherein determining the initial execution environment comprises applying a security policy.

10. The method of claim 1, wherein the first portion a single execution of the executable application includes execution of:
    a fiber;
    a thread;
    a process;
    a dynamic link library;
    a script; or
    a plug-in component.

11. A system comprising:
    a computer comprising one or more processors wherein the one or more processors are configured to:
       perform behavioral analysis on an executable application prior to each execution of the executable application, comprising:
          requesting behavioral information regarding prior performance of suspicious or out of policy activities of the executable application from a remote security database prior to each execution of the executable application; and
          evaluating the behavioral information obtained responsive to the request;
       determine an initial execution environment based on the behavioral analysis prior to each execution of the executable application, comprising:
          determining a first portion of a single execution of the executable application for execution in a first execution environment and a second portion of the single execution for execution in a second execution environment; and
          determining the initial execution environment as one of the first execution environment and the second execution environment;
       load the executable application for execution in the initial execution environment;
       collect behavioral characteristics of the executable application as it is executed in the initial execution environment; and
       determine from the collected behavioral characteristics whether execution of the executable application should be moved from the initial execution environment to a secondary execution environment while the executable application is still executing in the initial execution environment,
       wherein only one of the initial execution environment and the secondary execution environment is a protected execution environment.

12. The system of claim 11, wherein the one or more processors configured to perform behavioral analysis are further configured to evaluate a characteristic associated with the executable application, wherein the characteristic indicates whether the provider of the executable application can be trusted.

13. The system of claim 12, wherein the one or more processors configured to perform behavioral analysis are further configured to evaluate a plurality of characteristics including two or more of the following:
    network address the executable application was received from;
    trust level of the process that requested the executable application;
    signed certificate from a trusted source.

14. The system of claim 11, wherein the one or more processors configured to perform behavioral analysis are further configured to analyze, prior to execution of the executable application, a resource the executable application will utilize if executed.

15. The system of claim 11, wherein the one or more processors configured to perform behavioral analysis are further configured to determine a scope of restrictions a protected execution environment will use to control the execution of the executable application.

16. The system of claim 15, wherein the one or more processors configured to perform behavioral analysis are further configured to determine what types of activity should be contained within the protected execution environment.

17. The system of claim 15, wherein the one or more processors configured to perform behavioral analysis are further configured to apply a security policy when determining the scope of restrictions for use by the protected execution environment.

18. The system of claim 15, wherein the one or more processors configured to perform behavioral analysis are further configured to determine a disposition for operations performed within the protected execution environment by the executable application.

19. The system of claim 11, wherein the one or more processors configured to perform behavioral analysis are further configured to detect potentially malicious activities, including:
    opening resource files;
    loading plug-ins;
    manipulation by other processes;
    manipulating other processes; and
    accessing the Internet.

20. The system of claim 11, wherein the one or more processors configured to perform behavioral analysis are further configured to apply a security policy when evaluating a plurality of behavioral characteristics of the executable application to determine whether the initial execution environment should be a protected execution environment.

21. The system of claim 11, wherein the portion of the single execution of the executable application includes execution of:
   a fiber;
   a thread;
   a process;
   a dynamic link library;
   a script; or
   a plug-in component.

22. A non-transitory computer-readable storage medium comprising instructions stored thereon that when executed cause one or more processors to:
   perform behavioral analysis on an executable application prior to each execution of the executable application, comprising:
      requesting behavioral information regarding prior performance of suspicious or out of policy activities of the executable application from a remote security database prior to each execution of the executable application; and
      evaluating the behavioral information obtained responsive to the request;
   determine an initial execution environment based on the behavioral analysis prior to each execution of the executable application, comprising instructions that when executed cause the one or more processors to:
      determine a first portion of a single execution of the executable application for execution in a first execution environment and a second portion of the single execution for execution in a second execution environment; and
      determine the initial execution environment as one of the first execution environment and the second execution environment;
   load the executable application for execution in the initial execution environment;
   collect behavioral characteristics of the executable application as it is executed in the initial execution environment; and
   determine from the collected behavioral characteristics whether execution of the executable application should be moved from the initial execution environment to a secondary execution environment while the executable application is still executing in the initial execution environment,
   wherein only one of the initial execution environment and the secondary execution environment is a protected execution environment.

23. The non-transitory computer-readable storage medium of claim 22, further comprising instructions stored thereon to cause one or more processors to:
   monitor second behavioral characteristics of the executable application during execution within the secondary execution environment after the executable application is moved from the initial execution environment;
   perform behavioral analysis on the monitored second behavioral characteristics to determine whether the executable application should be moved from the secondary execution environment back to the initial execution environment; and
   move, based on the behavioral analysis of the monitored second behavioral characteristics, the executable application from the secondary execution environment to the initial execution environment prior to termination of the execution in the secondary execution environment.

* * * * *